United States Patent
Jhe et al.

(10) Patent No.: US 12,098,990 B2
(45) Date of Patent: Sep. 24, 2024

(54) RHEOMETER

(71) Applicants: SEOUL NATIONAL UNIVERSITY R&DB FOUNDATION, Seoul (KR); CHUNGBUK NATIONAL UNIVERSITY INDUSTRY—ACADEMIC COOPERATION FOUNDATION, Chungcheongbuk-do (KR)

(72) Inventors: Won Ho Jhe, Seoul (KR); Sang Min An, Gyeonggi-do (KR); Man Hee Lee, Chungcheongbuk-do (KR); Chung Man Kim, Seoul (KR)

(73) Assignees: SEOUL NATIONAL UNIVERSITY R&DB FOUNDATION, Seoul (KR); CHUNGBUK NATIONAL UNIVERSITY INDUSTRY—ACADEMIC COOPERATION FOUNDATION, Chungcheongbuk-Do (KR)

( * ) Notice: Subject to any disclaimer, the term of this patent is extended or adjusted under 35 U.S.C. 154(b) by 271 days.

(21) Appl. No.: 17/885,944

(22) Filed: Aug. 11, 2022

(65) Prior Publication Data
US 2022/0390345 A1   Dec. 8, 2022

Related U.S. Application Data

(63) Continuation of application No. PCT/KR2021/001405, filed on Feb. 3, 2021.

(30) Foreign Application Priority Data

Feb. 12, 2020   (KR) .................. 10-2020-0016746

(51) Int. Cl.
*G01N 11/16*   (2006.01)
*G01N 21/65*   (2006.01)

(52) U.S. Cl.
CPC ............ *G01N 11/16* (2013.01); *G01N 21/65* (2013.01)

(58) Field of Classification Search
None
See application file for complete search history.

(56) References Cited

U.S. PATENT DOCUMENTS

| | | | | |
|---|---|---|---|---|
| 4,941,346 A | * | 7/1990 | Suzuki | G01N 11/16 73/54.41 |
| 8,037,762 B2 | * | 10/2011 | La Rosa Flores | G01N 29/265 73/606 |

(Continued)

FOREIGN PATENT DOCUMENTS

| | | |
|---|---|---|
| JP | H07-270261 A | 10/1995 |
| JP | H10-253443 A | 9/1998 |

(Continued)

OTHER PUBLICATIONS

International Search Report for PCT/KR2021/001405 mailed on May 14, 2021.

*Primary Examiner* — Peter J Macchiarolo
*Assistant Examiner* — Jermaine L Jenkins
(74) *Attorney, Agent, or Firm* — The PL Law Group, PLLC

(57) ABSTRACT

A rheometer according to an embodiment includes a substrate on which an object to be measured is placed, a vibration unit configured to provide a vibration to the substrate, a plurality of probe units each including a quartz tuning fork and a contact member fixed to the quartz tuning fork, the contact member being able to contact the object, the plurality of probe units having different types of the contact members. Any one of the plurality of probe units is selected and contacts the object, and a controller configured to calculate a viscoelastic force of the object based on a (Continued)

vibration of the vibration unit and a vibration transmitted to the quartz tuning fork through the object from the vibration of the vibration unit.

10 Claims, 11 Drawing Sheets

(56) References Cited

U.S. PATENT DOCUMENTS

| | | | |
|---|---|---|---|
| 9,366,694 B2* | 6/2016 | Chaigneau | G01Q 10/00 |
| 10,288,541 B2* | 5/2019 | Hadj Henni | G01N 11/10 |
| 11,525,806 B2* | 12/2022 | Harrison | G01N 29/2437 |
| 2006/0288786 A1* | 12/2006 | Flores | G01N 29/0681 |
| | | | 73/602 |

FOREIGN PATENT DOCUMENTS

| | | |
|---|---|---|
| JP | 2000-121534 A | 4/2000 |
| JP | 2006-250690 A | 9/2006 |
| KR | 10-2001-0068003 A | 7/2001 |

\* cited by examiner

RHEOMETER

CROSS-REFERENCE TO RELATED APPLICATION AND CLAIM OF PRIORITY

The present application is a continuation of application to International Application No. PCT/KR2021/001405 with an International Filing Date of Feb. 3, 2021, which claims the benefit of Korean Patent Applications No. 10-2020-0016746 filed on Feb. 12, 2020 at the Korean Intellectual Property Office, the disclosures of which are incorporated by reference herein in their entirety.

BACKGROUND

1. Technical Field

The present disclosure relates to a rheometer, and more particularly to a rheometer capable of measuring physical properties of a soft material.

2. Background Art

Rheology is a device that studies phenomena such as elasticity, deformation, and flow (storage modulus/loss modulus measurement, etc.) that appear when a force is applied to a soft material (including liquid and colloidal materials/polymer material/biological material, etc.). The rheology can measure various mechanical properties of the soft material to find out essential properties of the soft material and apply them to industries.

A rheometer can measure various properties of a soft material and find out essential properties of the soft material. The rheometer has been very widely used not only in cutting-edge science, but also in the petroleum industry, cosmetics industry, medicine, food, chemical products, and other industries where soft materials (including liquid and colloidal materials/polymer material/biological material, etc.) are used.

A method of implementing the rheometer may be roughly divided into two methods. A first method is a flat plate method in which in a state where a soft material is placed between two plates and is pressed flat, a torque force generated by rotating one of the two plates is measured by a sensor. A second method is a capillary method that is implemented by measuring a flow rate changed while a soft material passes through a tube with a changing diameter.

In response to the development of industry and scientific technology, as a need for a very small amount of micro/nano-sized soft material increases, regulatory requirements regarding harmlessness to the human body in the use of soft material are emerging worldwide. However, the rheometer that has been recently implemented suggests a bulk type measurement method that uses a very large amount or a very large size of soft material. Therefore, the existing rheometer has limitations in measuring a very small amount of soft material, and in response to this demand, a rheometer capable of measuring a viscoelastic force and storage modulus/loss modulus of micro/nano-sized soft material including the bulk measurement was invented and is to be proposed as a patent. In addition, this includes a theory developed for bulk, micro/nano measurements and the possibility of simultaneous measurement of high frequency and low frequency.

SUMMARY

One aspect of the present disclosure provides a rheometer with an improved structure.

One aspect of the present disclosure provides a rheometer with an extended measurement application target.

In one aspect of the present disclosure, there is provided a rheometer including a substrate on which an object to be measured is placed; a vibration unit configured to provide the substrate with a vibration; a plurality of probe units each including a quartz tuning fork and a contact member fixed to the quartz tuning fork, the contact member being able to contact the object, the plurality of probe units having different types of the contact members, wherein any one of the plurality of probe units is selected and contacts the object; and a controller configured to calculate a viscoelastic force of the object based on the vibration of the vibration unit and a vibration transmitted to the quartz tuning fork through the object from the vibration of the vibration unit.

The rheometer may further include a driving unit configured to change an arrangement of the plurality of probe units so that any one of the plurality of probe units is selected and contacts the object.

The vibration unit may be configured to vibrate the substrate in one direction of a plane direction parallel to a plane, on which the object is placed, and an up-down direction perpendicular to the plane direction.

The quartz tuning fork may operate in one mode of a shear mode in which the contact member is disposed to vibrate in the plane direction when the vibration unit vibrates in the plane direction, and a tapping mode in which the contact member is disposed to vibrate in the up-down direction when the vibration unit vibrates in the up-down direction.

The plurality of probe units may include a first probe unit including a first contact member configured to contact the object of a macroscale; a second probe unit including a second contact member configured to contact the object of a microscale; and a third probe unit including a third contact member configured to contact the object of a nanoscale.

The rheometer may further include first to third objective lenses configured to have a magnification applied depending on a type of the object, the first to third objective lenses corresponding to the first to third probe units, wherein any one of the first to third objective lenses is selected and is directed toward the object.

The rheometer may further include a laser light source configured to irradiate a laser light to the object through the selected objective lens of the first to third objective lenses; and a Raman detector configured to detect a scattered light incident on the Raman detector, wherein the scattered light is converted from the laser light by the object.

The controller may obtain an elastic modulus $k_{int}$ and a damping coefficient $b_{int}$ of an interaction with the object, an elastic force $F_k$, a damping force $F_b$, energy dissipation $E_{dis}$ based on the following.

$$k_{int} = \frac{F}{A}\sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = -\frac{\pi k A_0^2}{Q}\left[\frac{A}{A_0}\cos\theta - \frac{\omega}{\omega_0}\left(\frac{A}{A_0}\right)\right]$$

Where Q is a quality factor, k is an elastic modulus of the quartz tuning fork, $A_0$ is a maximum amplitude appearing at a driving frequency w0, and A and θ are an amplitude and a phase appearing at a driving frequency w, respectively. In the case of Newtonian fluid, based on the elastic modulus and resistance coefficient information, a storage modulus G' and a loss modulus G" of a complex modulus of a material can be obtained as follows.

$$G' = \frac{\delta}{2\sigma}(k_{int} + b_{int}w)$$

$$G'' = \frac{\delta}{2\sigma}(-k_{int} + b_{int}w)$$

Where σ is a cross-sectional area of the contact member interacting with a liquid, and δ is a value of a viscous penetration depth. Because Newtonian fluid is a material in which the storage modulus G'=0 by definition, a fluid can be known to be non-Newtonian when the storage modulus G' is experimentally non-zero. In the case of non-Newtonian, an amplitude of the quartz tuning fork is changed, changes in values of G' and G" are observed, and a shear thinning or thickening phenomenon appearing in a non-Newtonian fluid is experimented.

The rheometer may further include a temperature control unit configured to control a temperature of the substrate; and a vibration measurement unit configured to measure the vibration of the quartz tuning fork, wherein the controller calculates physical properties of the object based on the temperature of the substrate, the vibration of the vibration unit, and a vibration measured by the vibration measurement unit.

According to one aspect of the present disclosure, the present disclosure can extend types of measurable soft materials to a macroscale, a microscale, and a nanoscale.

According to one aspect of the present disclosure, the present disclosure can measure physical properties by selecting one of a plurality of probe units even when types of soft materials are various.

According to one aspect of the present disclosure, the present disclosure can measure various physical properties by applying a force to a soft material in a horizontal or vertical direction.

DETAILED DESCRIPTION

Figure 1:
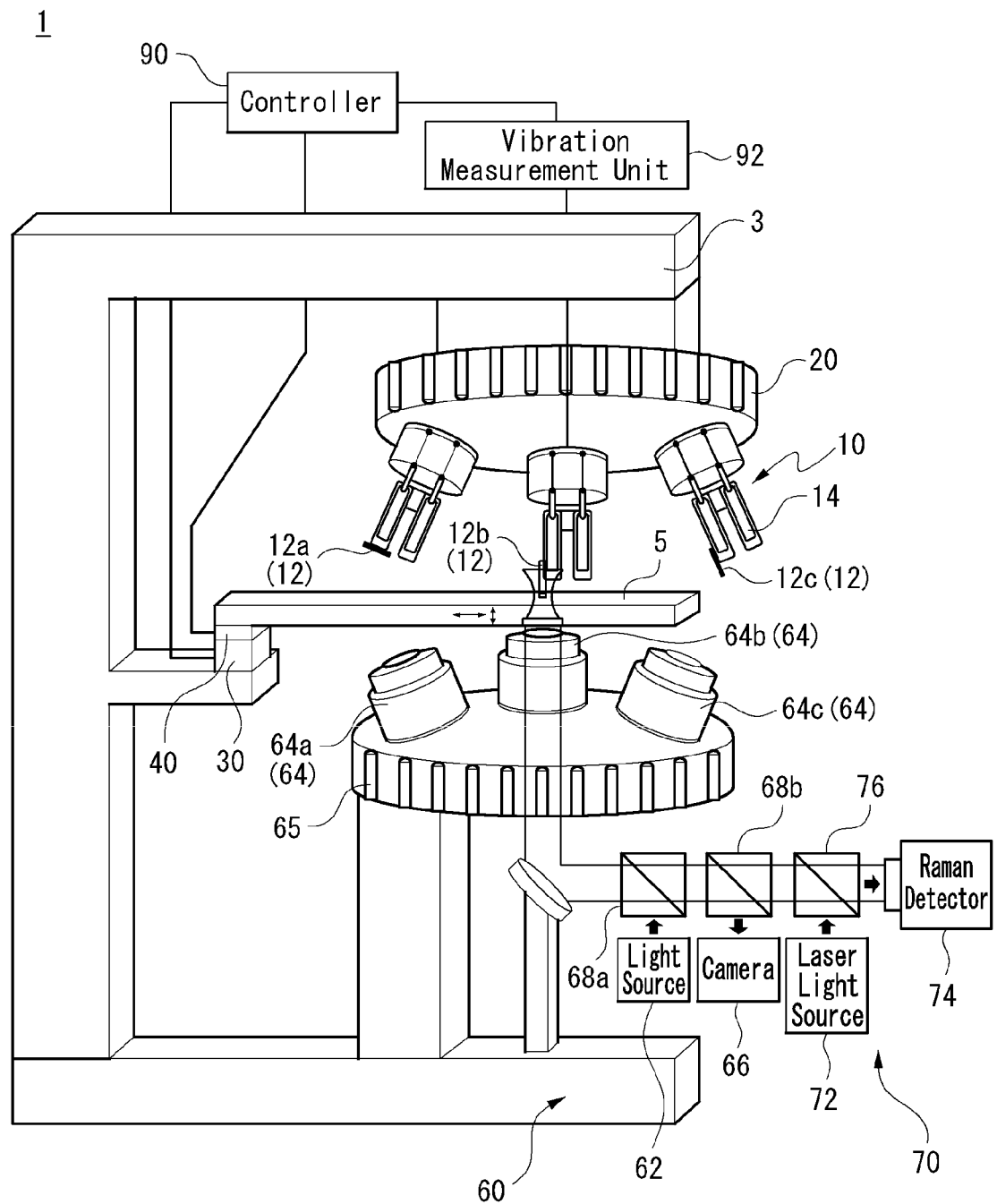
FIG. 1 illustrates a rheometer according to an embodiment of the present disclosure.

The configuration described and illustrated in embodiments and drawings of the present disclosure is merely a preferred example of the disclosed invention, and there may be various modifications that can replace the embodiments and drawings of the present disclosure at the time of filing of the present application.

The same reference numerals illustrated in drawings of the present disclosure indicate parts or components that perform substantially the same functions.

The terminology used in the present disclosure is used to describe embodiments, and is not intended to limit and/or restrict the disclosed invention. A singular expression can include a plural expression as long as it does not have an apparently different meaning in context. In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

The terms including an ordinal number such as first, second, etc. may be used to describe various components, but the components are not limited by such terms. The terms are used only for the purpose of distinguishing one component from other components. For example, a first component may be designated as a second component, and a second component may be designated as a first component without departing from the scope of the present disclosure. The term of "and/or" includes any combination of a plurality of related listed items or any of a plurality of related listed items.

In addition, the terms of "~ unit", "~ part", "~ block", "~ member", "~ module", etc. may mean a unit for processing at least one function or operation. For example, the above terms may mean at least one hardware such as field-programmable gate array (FPGA)/application specific integrated circuit (ASIC), at least one software stored in a memory, or at least one process processed by a processor.

Reference will now be made in detail to embodiments of the present disclosure, examples of which are illustrated in the accompanying drawings. However, the following drawings attached to the present disclosure illustrate preferred embodiments of the present disclosure, and serve to further understand the technical idea of the present disclosure together with the above-described content of the present disclosure. Therefore, the present disclosure should not be construed as being limited only to the matters described in the accompanying drawings.

Figure 2:
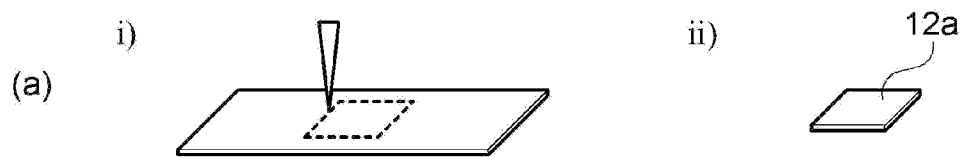
FIG. 2 illustrates the manufacturing of a contact member of a rheometer according to an embodiment of the present disclosure.
Figure 2:
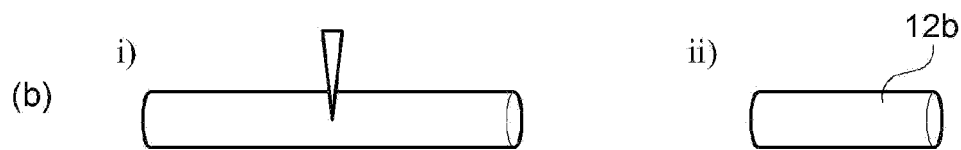
Figure 2:
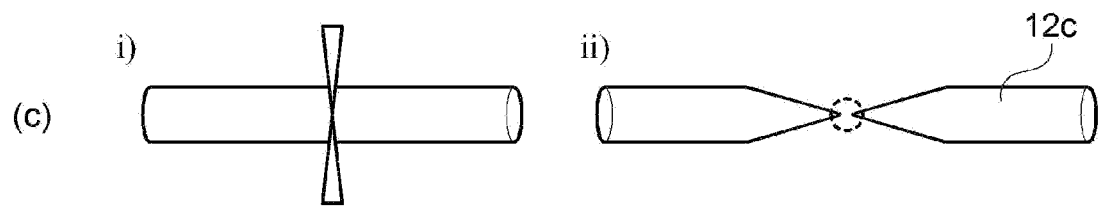

FIG. 1 illustrates a rheometer according to an embodiment of the present disclosure. FIG. 2 illustrates the manufacturing of a contact member of a rheometer according to an embodiment of the present disclosure.

A rheometer is a device that measures rheological properties (viscosity, elastic modulus, stress, shear rate, etc. of a material) of an object to be measured. The rheometer is also a device that grasps a structure and properties of a material in a physical method by applying a flow and a deformation to an object to be measured. The rheometer that is a device used to measure rheological properties of an object to be measured is configured to measure a force generating deformation, viscoelasticity, storage modulus/loss modulus, etc. by applying a shear rate or a vibration to the object to be measured used to measure the rheological properties.

A rheometer 1 may include a probe unit 10.

The probe unit 10 may be provided so as to be in contact with an object M to be measured (see FIGS. 3 to 8) placed on a substrate 5. The probe unit 10 may include a contact member 12 and a quartz tuning fork (QTF) 14. As described later, the probe unit 10 may measure a vibration that is generated from a vibration unit 30 through the quartz tuning fork 14 and passes through the object M to be measured. However, the present disclosure is not limited thereto, and as another example, vibration may be generated through the probe unit 10. In this case, the vibration unit 30 may measure a vibration passing through the object M to be measured. The vibration generated through the probe unit 10 may include a high frequency vibration.

The contact member 12 may be fixed by being attached to the quartz tuning fork 14. Through this configuration, the vibration from the contact member 12 is configured to be transmitted to the quartz tuning fork 14, or the vibration from the quartz tuning fork 14 is configured to be transmitted to the contact member 12.

A type of the contact member 12 may vary depending on a type of the object M to be measured. The object M to be measured may include a soft material. The object M to be measured may include liquid, colloidal, polymer, and biological materials. The object M to be measured may use a soft material with any one of a macroscale, a microscale, and a nanoscale.

The contact member 12 may include a first contact member 12a that is applied when the object M to be measured has a macroscale, a second contact member 12b that is applied when the object M to be measured has a microscale, and a third contact member 12c that is applied when the object M to be measured has a nanoscale. For convenience of description, in the probe unit 10, a probe unit having the first contact member 12a may be defined as a first probe unit, a probe unit having the second contact member 12b may be defined as a second probe unit, and a probe unit having the third contact member 12c may be defined as a third probe unit.

The first contact member 12a may be configured such that a contact surface contacting the object M to be measured is in a macroscale. The first contact member 12a may include a mica plate with a predetermined size. Referring to (a) of FIG. 2, the first contact member 12a may be manufactured i) using the mica plate using a knife ii) as a first contact member 12a having a contact surface of a predetermined size. The first contact member 12a may have horizontal and vertical lengths of 1 mm. The material and size of the first contact member 12a are not limited. Since the first contact member 12a contacts the object M to be measured of a macroscale that is a size that can be observed with the naked eye, this is satisfied if an area of the contact surface of the first contact member 12a corresponds to the object M to be measured of a macroscale.

The second contact member 12b may be configured such that a contact surface contacting the object M to be measured is in a microscale. The second contact member 12b may include an optical fiber. Referring to (b) of FIG. 2, the second contact member 12b may be manufactured i) by cutting the optical fiber ii) as a second contact member 12b having a contact surface of a predetermined diameter. A diameter of the optical fiber may apply approximately 100 μm. The material and size of the second contact member 12b are not limited. Since the second contact member 12b contacts the object M to be measured of a microscale, this is satisfied if an area of the contact surface of the second contact member 12b corresponds to the object M to be measured of a microscale.

The third contact member 12c may be configured such that a contact surface contacting the object M to be measured is in a nanoscale. The third contact member 12c is a probe, and the contact surface of the third contact member 12c may mean a tip of the probe. The third contact member 12c may be formed in a shape of a needle. Referring to (b) of FIG. 2, the third contact member 12c may be manufactured as ii) a third contact member 12c having an end tip size of a nanoscale in a pen shape when a quartz rod is pulled using a mechanical puller i) while being irradiated with a strong laser to the center and melting.

The quartz tuning fork 14 is provided to vibrate by the vibration transmitted through the contact member 12. The quartz tuning fork 14 may be connected to a vibration measurement unit 92. The vibration measurement unit 92 may measure an amplitude and a phase of the vibration transmitted to the quartz tuning fork 14. In the analysis of the mechanical properties of the object M to be measured, there may be a case where horizontal force measurement is required and a case where vertical force measurement is required. An attaching method of the contact member 12 to the quartz tuning fork 14 and a vibration direction of the quartz tuning fork 14 may vary depending on the above purpose.

A plurality of probe units 10 may be provided. As described above, the plurality of probe units 10 may have a different form depending on a type of the contact member 12 and a measurement mode (shear mode or tapping mode) to be described later. That is, the plurality of probe units 10 may include six probe units in which the first to third contact members 12a, 12b, and 12c are disposed on each of the quartz tuning fork of the shear mode and the quartz tuning fork of the tapping mode. The plurality of probe units 10 are illustrated in FIGS. 3 to 8 to be described later. However, the present disclosure is not limited thereto, and only some of the plurality of probe units 10 may be mounted on according to the user's convenience.

The rheometer 1 may include a driving unit 20.

The plurality of probe units 10 are mounted on the driving unit 20, and the driving unit 20 may be configured such that one of the plurality of probe units 10 is selected and contacts the object M to be measured placed on the substrate 5. That is, the driving unit 20 may change the arrangement of the plurality of probe units 10. The driving unit 20 on which the plurality of probe units 10 are mounted may be rotatably provided on a main body 3, and may change the probe unit 10 contacting the object M depending on the type of the object M or the measurement mode (shear mode or tapping mode).

The rheometer 1 may include a vibration unit 30 and an optical unit 50.

The vibration unit 30 is connected to the substrate 5, and the substrate 5 is configured to operate with a vibration of a predetermined magnitude. The vibration unit 30 may include a piezoelectric transducer (PZT). The vibration unit 30 is configured to generate vibration and vibrate the substrate 5. The vibration generated from the vibration unit 30 may include a low frequency vibration and a high frequency vibration.

The vibration unit 30 may be configured to vibrate the substrate 5 in one direction of a plane direction parallel to a plane on which the object is placed, and an up-down direction perpendicular to the plane direction. The quartz tuning fork 14 may be disposed to vibrate in the same direction as the vibration direction of the vibration unit 30. That is, when the vibration unit 30 vibrates in the plane direction, the quartz tuning fork 14 may operate in the shear mode, and when the vibration unit 30 vibrates in the up-down direction, the quartz tuning fork 14 may operate in the tapping mode. FIG. 1 illustrates that the vibration unit 30 is disposed on one side of the substrate 5, by way of example, but the present disclosure is not limited thereto. The vibration unit 30 satisfies this if it is connected to the substrate 5 in order to generate vibration in the substrate 5.

The optical unit 50 may include an optical microscope 60 for observing the object M to be measured, and a Raman analysis device 70 for Raman spectroscopy.

The optical microscope 60 may include a light source 62, an objective lens 64, and a camera 66. Light supplied from the light source 62 may be adjusted by a beam splitter 68a, may pass through the objective lens 64, and may be directed toward the object M to be measured. Light reflected by the object M may be adjusted by a beam splitter 68b and may be incident on the camera 66. Based on this, by adjusting a position of the object M or a position of the substrate 5, it is possible to focus the objective lens 64 on the object M to be measured. A user can observe the object M to be measured through the optical microscope 60.

The objective lens 64 may include first to third objective lenses 64a, 64b and 64c that have a magnification applied depending on the scale of the object M to be measured. The first to third objective lenses 64a, 64b and 64c may correspond to the first to third probe units, and may be disposed such that any one objective lens is selected and is directed toward the object to be measured. The first to third objective lenses 64a, 64b and 64c may be mounted on a rotation mount 65 and may be selectively disposed to be directed toward the object M to be measured.

The Raman analysis device 70 may include a laser light source 72 generating a laser, and a Raman detector 74 measuring scattered light.

The laser light source 72 is provided to scan laser light to the object M to be measured for Raman spectroscopy. The laser light source 72 may irradiate the laser light to the object M through the objective lens selected from among the first to third objective lenses 64a, 64b and 64c.

When the object M to be measured has a nanoscale, the probe unit 10 may apply the third contact member 12c. The laser light generated from the laser light source 72 may be irradiated to the tip of the third contact member 12c to enhance a Raman signal of the nanoscale object M to be measured.

The laser light may use a laser having a wavelength of 488 nm, 532 nm, or 633 nm. A wavelength of the laser may be selected depending on a type of the third contact member 12c. For example, when the type of the third contact member 12c is of gold, a 633 nm laser may be used, and when the type of the third contact member 12c is of silver, a 532 nm laser may be used. By analyzing a degree of Raman transition of a surface shape by using a Raman spectrometer that matches the corresponding laser wavelength to each wavelength of light scattered from the object M, information on motion in unit of molecular can be obtained and diagnosed.

The laser light may be adjusted by a beam splitter 76 and may be incident on the objective lens 64. The laser light source 72 may irradiate the laser light to the object M along an optical path that reaches the object M from the beam splitter 68a through the objective lens 64. The laser light incident through the objective lens 64 collides with the object M and is scattered. In this case, most of the light is scattered with the same energy as the incident light, but a part is inelastically scattered by exchanging energy with the object M at a unique degree.

In the scattering, a wavelength of Stokes scattering in which the light source 62 loses energy and a wavelength of anti-Stokes scattering in which the light source 62 gains energy may appear in a unique form depending on the physical properties of the object M to be measured. The Raman detector 74 may collect it and display it as a unique type of spectrum.

The Raman detector 74 is configured to measure light scattered from the object M to be measured. The Raman detector 74 may acquire spectroscopic information of the object M to be measured through the scattered light.

As described above, after repeatedly capturing Raman spectrum images through the Raman analysis device 70, characteristics of the object M can be understood by analyzing the images with a computer (not shown).

The Raman analysis device 70 can perform high-resolution Raman spectroscopic analysis through the Raman signal amplified by the tip of the third contact member 12c. This method is called tip-enhances Raman spectroscopy (TERS). The TERS is a spectroscopy method that captures a Raman spectrum in an area of several tens of nm around a tip of a probe by using a very strongly increased electric field at the tip of the probe.

As described above, since the Raman analysis device 70 can operate even when the optical microscope 60 is operating, the object M to be measured can be analyzed in real time.

The rheometer 1 may include a controller 90.

The controller 90 can measure mechanical properties of the object M based on an input of vibration generated by the vibration unit 30 and an output of vibration that is converted while passing the object M and is transmitted to a vibration measurement device of the quartz tuning fork 14. That is, the controller 90 may calculate the mechanical properties of the object M based on amplitudes and phases of the input and output vibrations. The mechanical properties may include a viscous force and an elastic force.

The controller measures information on amplitudes A and phases θ of the input vibration and the output vibration and calculates an effective elastic modulus $k_{int}$ and a damping coefficient $b_{int}$ by substituting it into the following formula. Hence, the controller can find an elastic force $F_k$, a damping force $F_b$, and energy dissipation $E_{dis}$.

$$k_{int} = \frac{F}{A} \sin\theta + m\omega^2 - k$$

$$b_{int} = \frac{F}{A\omega} \cos\theta - b$$

$$F_k = k_{int}A$$

$$F_b = b_{int}\omega A$$

$$E_{dis} = -\frac{\pi k A_0^2}{Q}\left[\frac{A}{A_0}\cos\theta - \frac{\omega}{\omega_0}\left(\frac{A}{A_0}\right)\right]$$

Where Q is a quality factor, k is an elastic modulus of the quartz tuning fork, $A_0$ is a maximum amplitude appearing at a driving frequency w0, and A and θ are an amplitude and a phase measured at a driving frequency w, respectively. In the case of Newtonian fluid, based on the elastic modulus and resistance coefficient information, a storage modulus G' and a loss modulus G" of a complex modulus of a material can be obtained as follows.

$$G' = \frac{\delta}{2\sigma}(k_{int} + b_{int}w)$$

$$G'' = \frac{\delta}{2\sigma}(-k_{int} + b_{int}w)$$

Where σ is a cross-sectional area of the contact member interacting with a liquid, and δ is a value of a viscous penetration depth. Because Newtonian fluid is a material in which the storage modulus G'=0 by definition, a fluid can be known to be non-Newtonian when the storage modulus G' is experimentally non-zero. In the case of non-Newtonian, an amplitude of the quartz tuning fork is changed, changes in values of G' and G" are observed, and a shear thinning or thickening phenomenon appearing in a non-Newtonian fluid is experimented.

The rheometer 1 may include a temperature control unit 40.

The temperature control unit 40 is connected to the substrate 5 and may control a temperature of the substrate 5. The controller 90 may control the temperature control unit 40 so that the substrate 5 reaches a set temperature. The controller 90 can calculate the mechanical properties based on the temperature together with the amplitude and phase of the input vibration input to the vibration unit 30 and the amplitude and phase of the output vibration measured by the vibration measurement unit 92 described above, when measuring the mechanical properties such as a viscous force and an elastic force of the object M to be measured.

Figure 3:
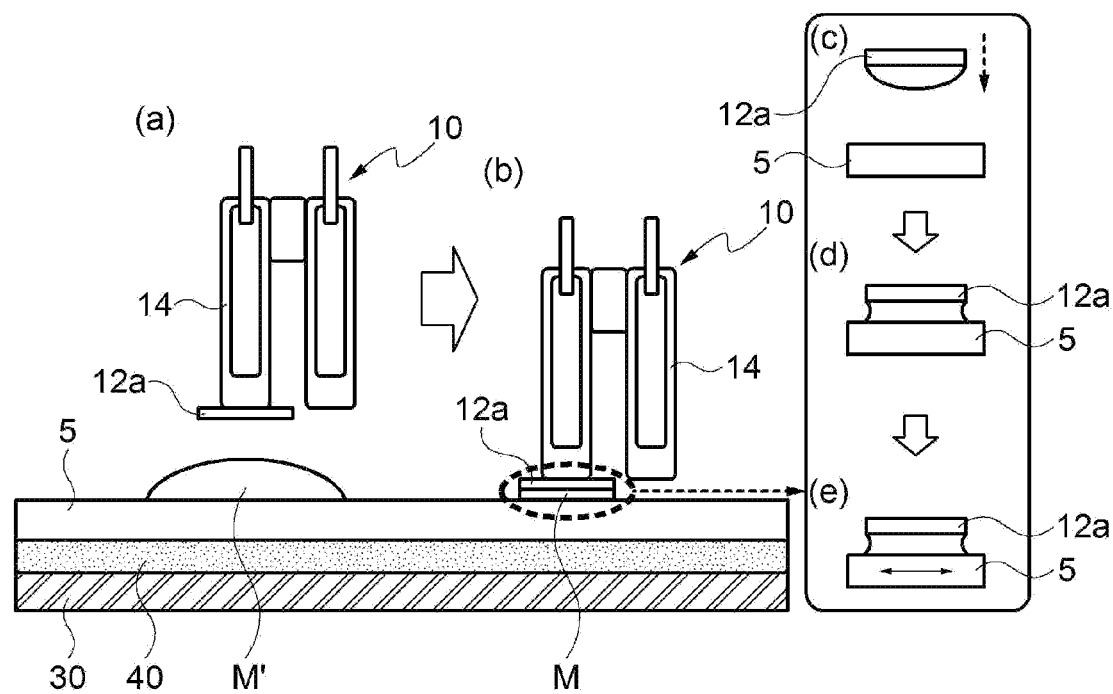
FIGS. 3 and 4 illustrate that a first contact member of a rheometer according to an embodiment of the present disclosure is applied, and a quartz tuning fork operates in a sheer mode and a tapping mode.
Figure 4:
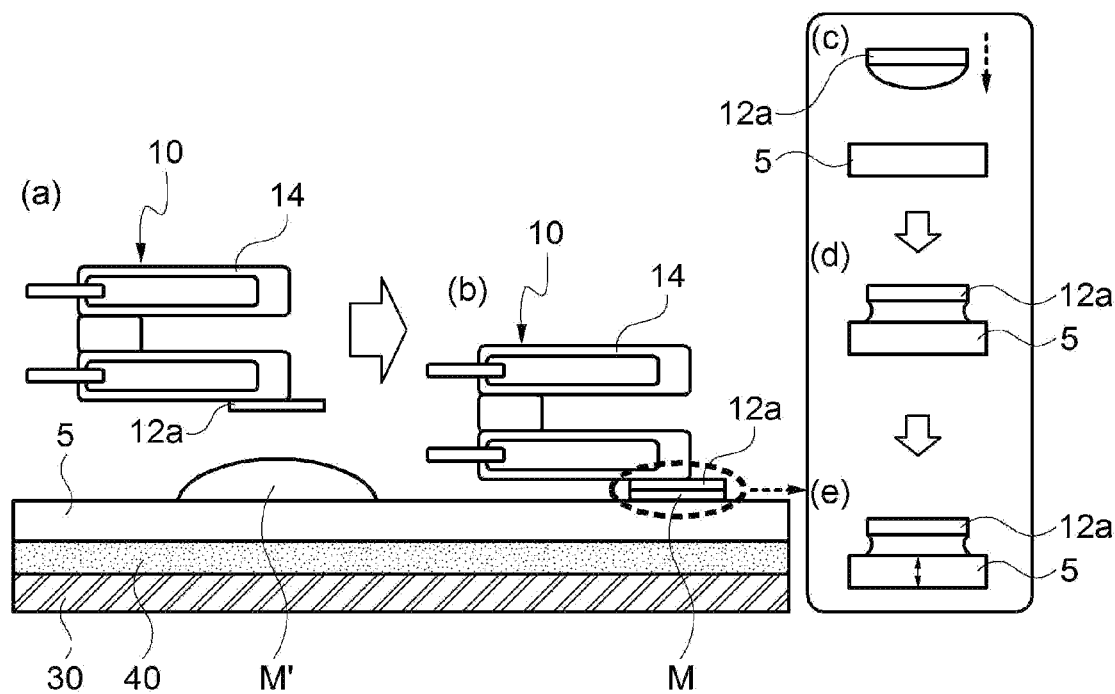
Figure 5:
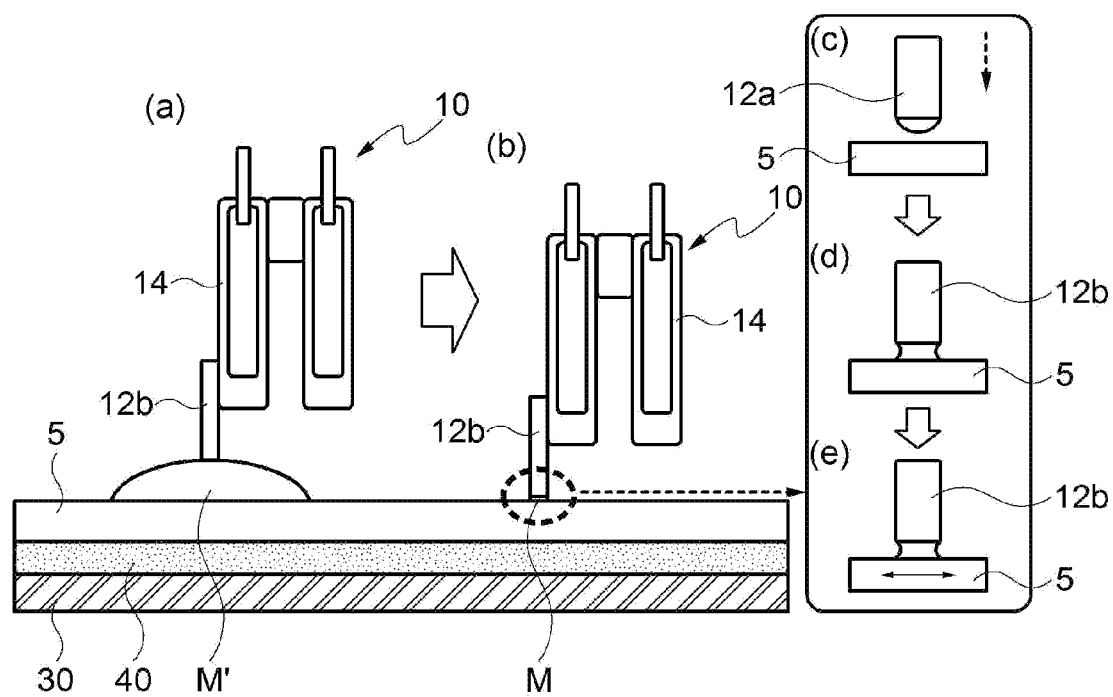
FIGS. 5 and 6 illustrate that a second contact member of a rheometer according to an embodiment of the present disclosure is applied, and a quartz tuning fork operates in a sheer mode and a tapping mode.
Figure 6:
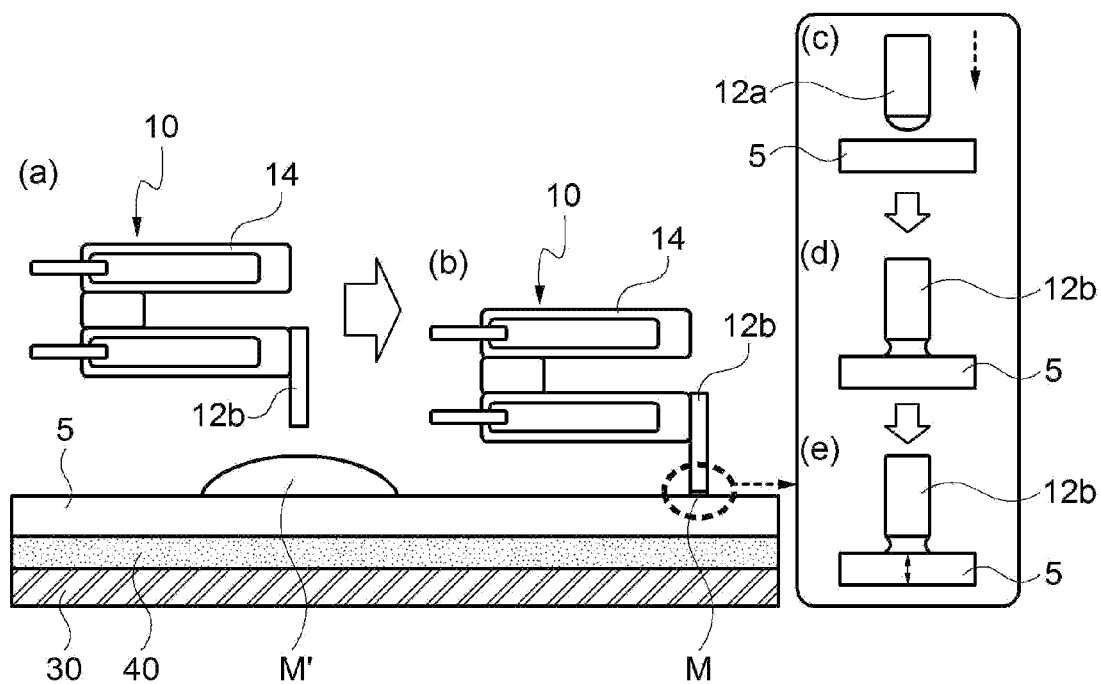
Figure 7:
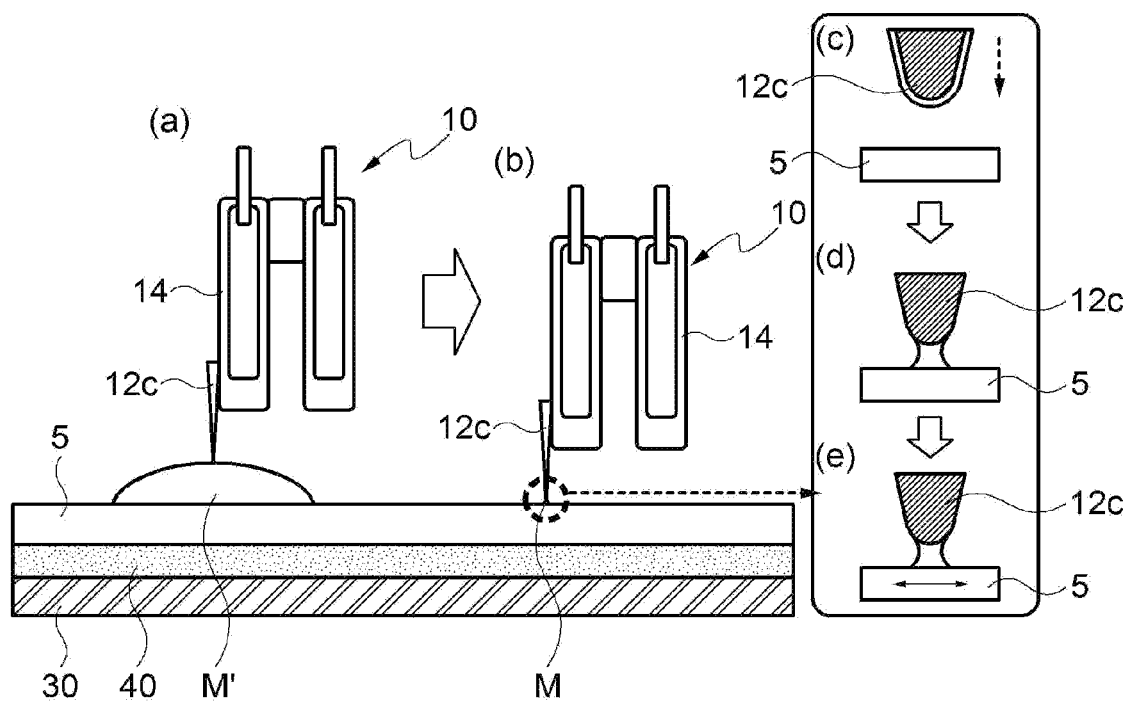
FIGS. 7 and 8 illustrate that a third contact member of a rheometer according to an embodiment of the present disclosure is applied, and a quartz tuning fork operates in a sheer mode and a tapping mode.
Figure 8:
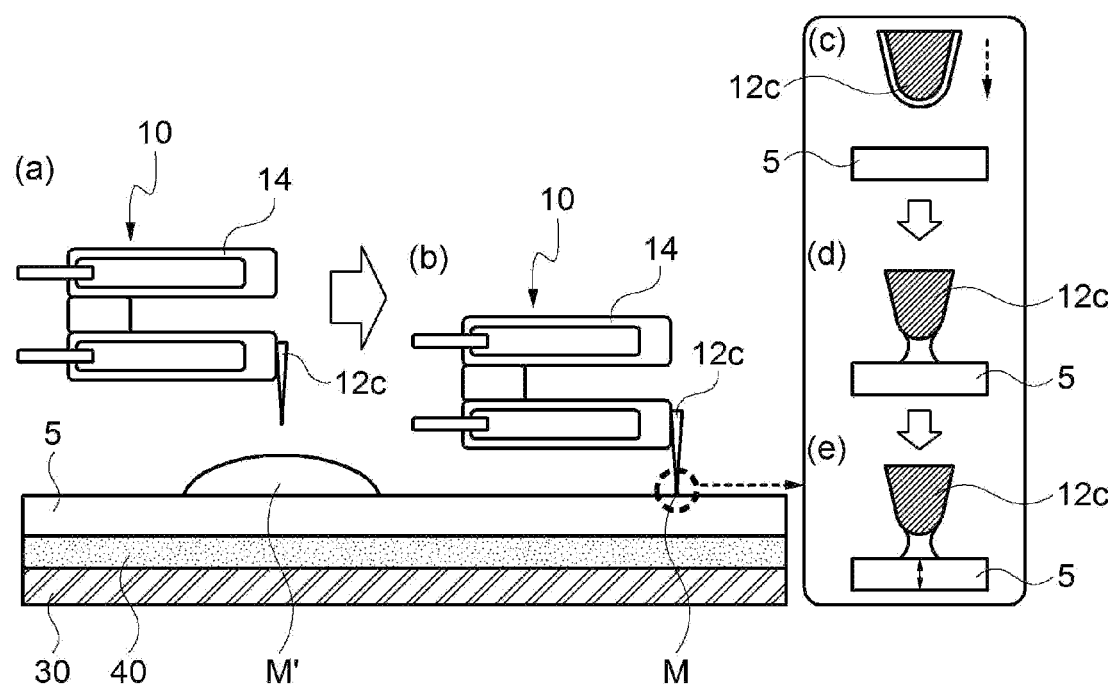

FIGS. 3 and 4 illustrate that a first contact member of a rheometer according to an embodiment of the present disclosure is applied, and a quartz tuning fork operates in a sheer mode and a tapping mode. FIGS. 5 and 6 illustrate that a second contact member of a rheometer according to an embodiment of the present disclosure is applied, and a quartz tuning fork operates in a sheer mode and a tapping mode. FIGS. 7 and 8 illustrate that a third contact member of a rheometer according to an embodiment of the present disclosure is applied, and a quartz tuning fork operates in a sheer mode and a tapping mode.

FIGS. 3 and 4 illustrate the object M to be measured having a macroscale, and the probe unit 10 to which the first contact member 12*a* is applied. FIGS. 5 and 6 illustrate the object M to be measured having a microscale, and the probe unit 10 to which the second contact member 12*b* is applied. FIGS. 7 and 8 illustrate the object M to be measured having a nanoscale, and the probe unit 10 to which the third contact member 12*c* is applied.

The probe unit 10 may operate in two modes. The probe unit 10 may operate in a shear mode and a tapping mode. FIGS. 3, 5 and 7 illustrate the probe unit 10 operating in the shear mode, and FIGS. 4, 6 and 8 illustrate the probe unit 10 operating in the tapping mode.

The shear mode may be operated when analysis of a horizontal vibration for the object M to be measured is required. The tapping mode may be operated when analysis of a vertical vibration for the object M to be measured is required. In FIGS. 3 to 8, descriptions of (a) to (e) can be commonly applied.

Step 1) The probe unit 10 may be configured such that the contact member 12 is fixed to the quartz tuning fork 14. The contact member 12 approaches the object M to be measured, and an appropriate amount of the object M to be measured is coated on a contact surface of the contact member 12 (see (a)). The object M to be measured that will contact the contact member 12 may be disposed on the substrate 5 as illustrated in FIGS. 3 to 8, and the contact member 12 may contact the object M to be measured so that the contact member 12 is coated with the object M to be measured positioned outside the rheometer 1.

Step 2) The probe unit 10 coated with the object M to be measured moves to an upper surface of the substrate 5 (see (b)). In this instance, in the shear mode illustrated in FIGS. 3, 5 and 7, the vibration direction of the quartz tuning fork 14 may be aligned to be horizontal to the surface of the substrate 5. In the tapping mode illustrated in FIGS. 4, 6 and 8, the vibration direction of the quartz tuning fork 14 may be aligned to be vertical to the surface of the substrate 5.

Step 3) The contact member 12 coated with the object M to be measured approaches the surface of the substrate 5 (see (c)), and a pillar of the object M to be measured is formed when a bottom surface of the object M to be measured contacts the surface of the substrate 5 (see (d)). Based on a scale of the object M to be measured, a pillar of a macroscale may be formed as illustrated in FIGS. 3 and 4, a pillar of a microscale may be formed as illustrated in FIGS. 5 and 6, and a pillar of a nanoscale may be formed as illustrated in FIGS. 7 and 8.

Step 4) The vibration unit 30 attached to the substrate 5 may vibrate the object M to be measured at an amplitude of a specific magnitude and a phase in the horizontal direction ((e) of FIGS. 3, 5 and 7) or the vertical direction ((e) of FIGS. 4, 6 and 8). The object M to be measured disposed between the contact member 12 and the surface of the substrate 5 vibrates through this operation, and a resulting force is transmitted to the quartz tuning fork 14 and changes an amplitude and a phase of the quartz tuning fork 14. That is, the amplitude and the phase of the vibration output from the quartz tuning fork 14 are different from the amplitude and the phase of the vibration input to the vibration unit 30 by the object M to be measured. The controller 90 may measure the input and output vibrations to measure the mechanical properties of the object M to be measured. The mechanical properties may include a viscous force and an elastic force.

Figure 9:
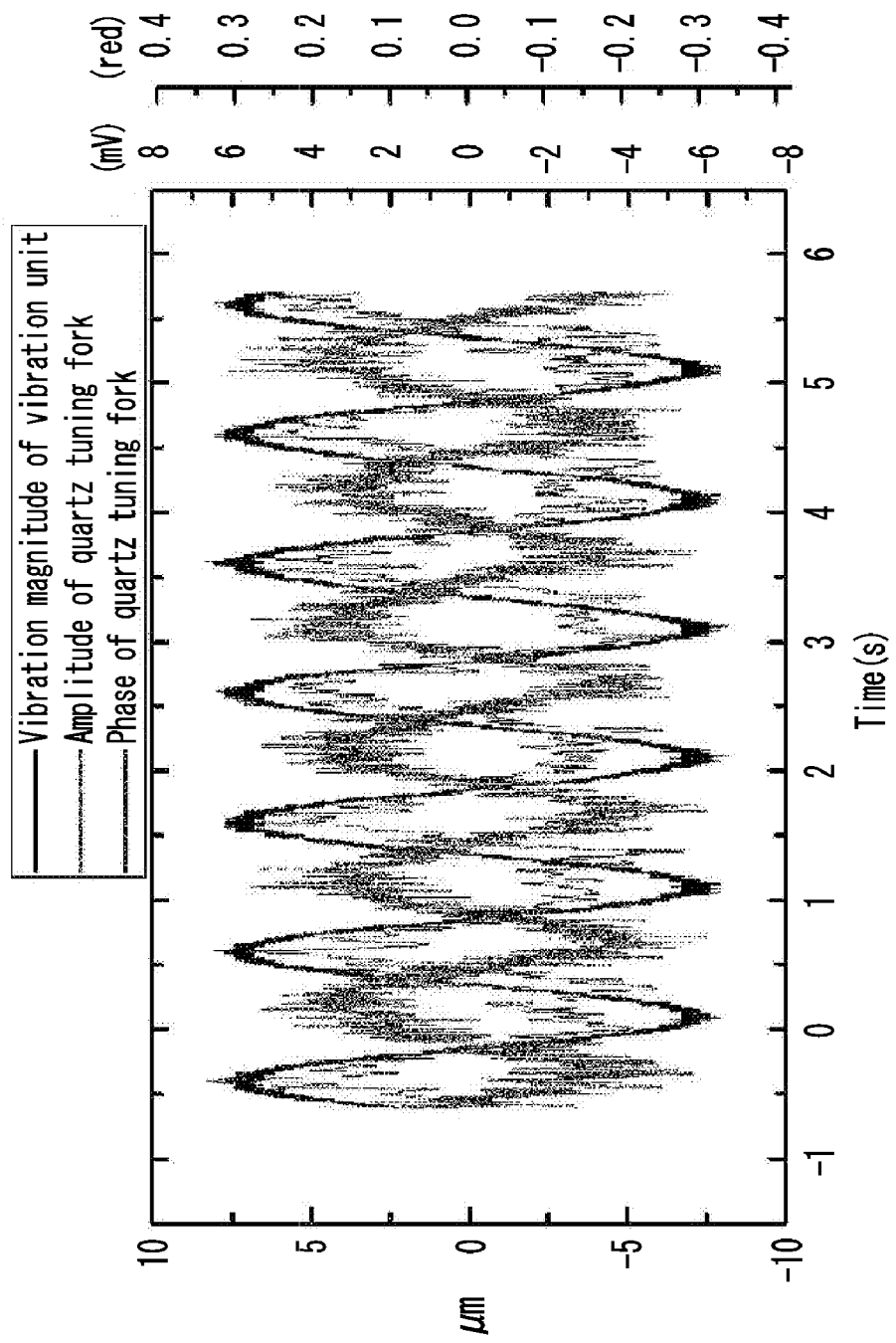
FIG. 9 is a graph illustrating an amplitude and a phase of a quartz tuning fork depending on vibration of a vibration unit by a rheometer according to an embodiment of the present disclosure.

FIG. 9 is a graph illustrating an amplitude and a phase of a quartz tuning fork depending on vibration of a vibration unit by a rheometer according to an embodiment of the present disclosure.

As illustrated in FIG. 9, the vibration of the vibration unit 30 is converted as the vibration unit 30 passes through the object M to be measured, and the amplitude and phase in the quartz tuning fork 14 are different from the vibration of the vibration unit 30.

The vibration of the vibration unit 30 is converted as the vibration unit 30 passes through the object M to be measured, and the amplitude and phase in the quartz tuning fork 14 are different from the vibration of the vibration unit 30.

The controller 90 may calculate the mechanical properties of the object M to be measured based on the vibration of the vibration unit 30 and the vibration of the quartz tuning fork 14.

Figure 10:
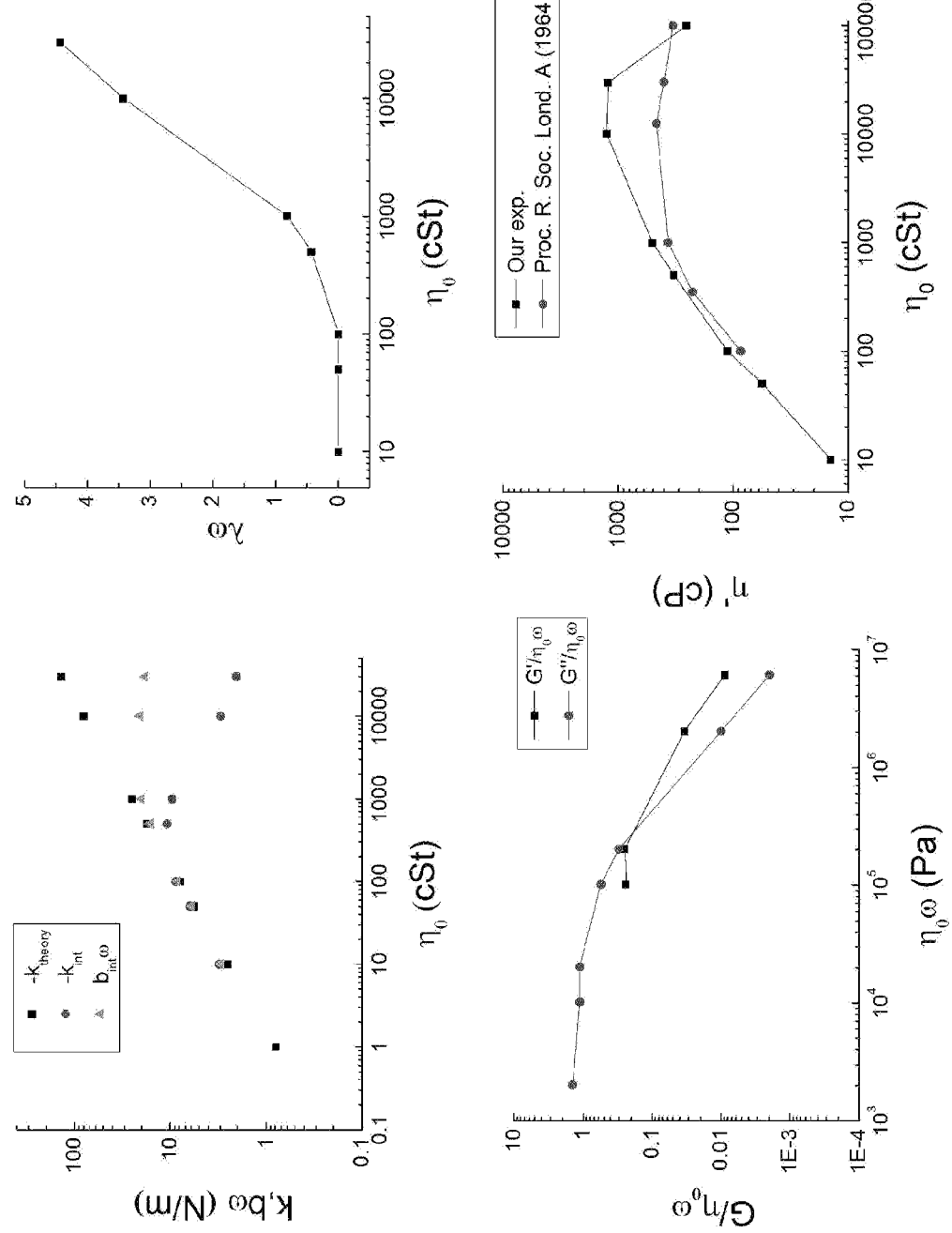
FIG. 10 is a graph illustrating various measurement values calculated with an amplitude and a phase of the quartz tuning fork depending on viscosity of a silicone oil by the rheometer using the second contact member according to an embodiment of the present disclosure.

FIG. 10 is a graph illustrating various measurement values calculated with an amplitude and a phase of the quartz tuning fork 14 depending on viscosity of a silicone oil by the rheometer using the second contact member 12*b* according to an embodiment of the present disclosure.

As illustrated in FIG. 10, depending on the amplitude and the phase of the quartz tuning fork 14, an elastic modulus and a viscous modulus by interaction with the object M to be measured can be calculated, and an elastic modulus, a storage modulus, a loss modulus, and kinematic viscosity of the object M to be measured may also be calculated.

Figure 11:
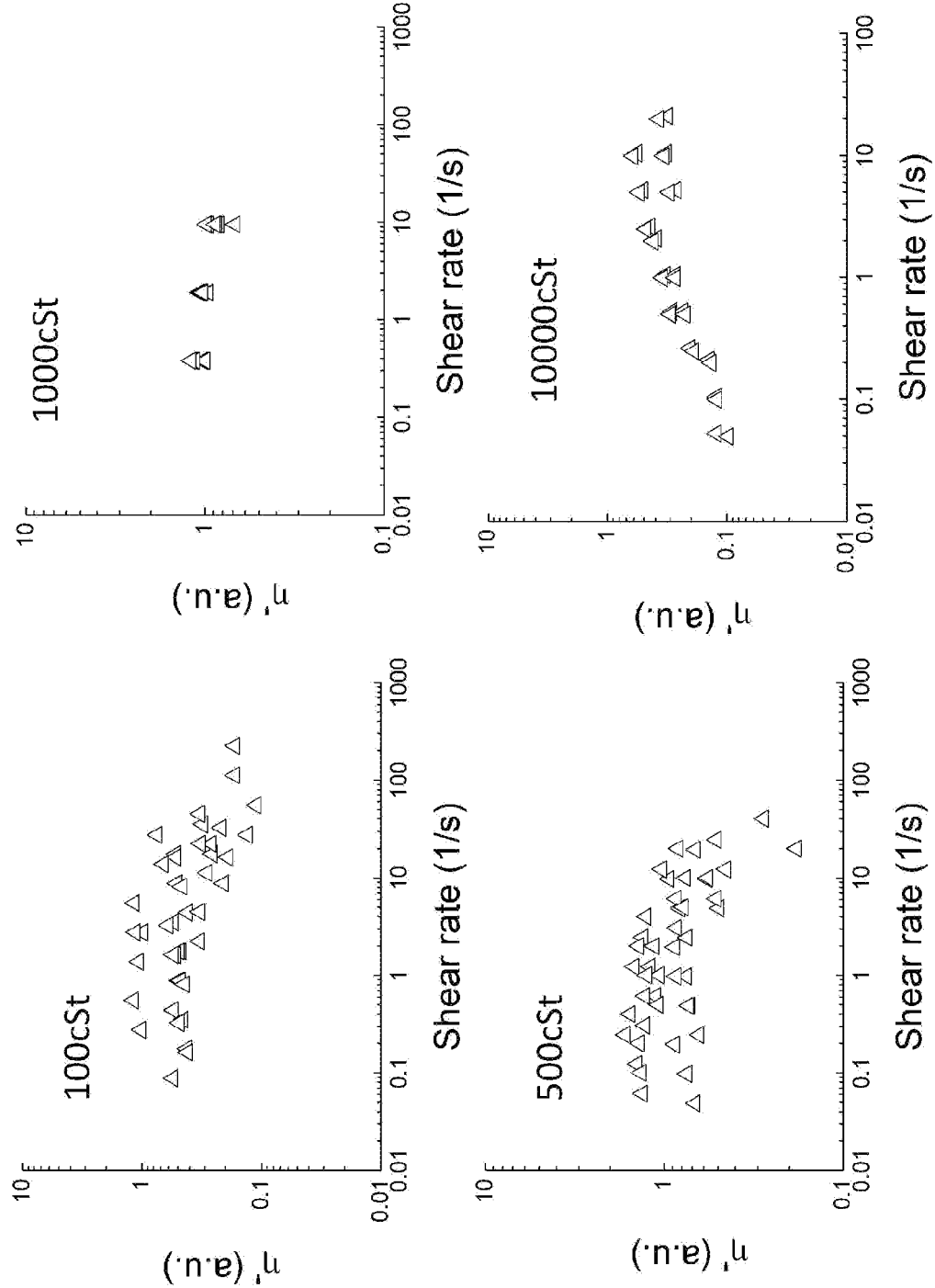
FIG. 11 is a graph illustrating kinematic viscosity depending on a shear rate of the substrate by viscosity of a silicone oil and vibration of the vibration unit by the rheometer using the second contact member according to an embodiment of the present disclosure.

FIG. 11 is a graph illustrating kinematic viscosity depending on a shear rate of the substrate 5 by viscosity of a silicone oil and vibration of the vibration unit 30 by the rheometer using the second contact member 12*b* according to an embodiment of the present disclosure.

The amplitude and the phase are measured as illustrated in FIG. 9 to measure the kinematic viscosity of the object M to be measured based on the shear rate according to the vibration of the vibration unit 30 as illustrated in FIG. 11.

Although the embodiments have been described with reference to a number of illustrative embodiments thereof, numerous other modifications and embodiments may be devised by those skilled in the art that will fall within the scope of the principles of the present disclosure. In particular, various variations and modifications are possible in the component parts and/or arrangements of the subject combination arrangement within the scope of the present disclosure, the drawings and the appended claims.

What is claimed is:

1. A rheometer comprising:
   a substrate on which an object to be measured is placed;
   a vibration unit configured to provide the substrate with a vibration;
   a plurality of probe units each including:
     a quartz tuning fork; and
     a contact member fixed to the quartz tuning fork, the contact member being able to contact the object, the plurality of probe units having different types of the contact members, wherein any one of the plurality of probe units is selected and contacts the object; and
   a controller configured to calculate a viscoelastic force of the object based on the vibration of the vibration unit and a vibration transmitted to the quartz tuning fork through the object from the vibration of the vibration unit.

2. The rheometer of claim 1, further comprising:
   a driving unit configured to change an arrangement of the plurality of probe units so that any one of the plurality of probe units is selected and contacts the object.

3. The rheometer of claim 1, wherein the vibration unit is configured to vibrate the substrate in one direction of a plane direction parallel to a plane, on which the object is placed, and an up-down direction perpendicular to the plane direction.

4. The rheometer of claim 3, wherein the quartz tuning fork operates in one mode of:
   a shear mode in which the contact member is disposed to vibrate in the plane direction when the vibration unit vibrates in the plane direction; and
   a tapping mode in which the contact member is disposed to vibrate in the up-down direction when the vibration unit vibrates in the up-down direction.

5. The rheometer of claim 1, wherein the plurality of probe units include:
   a first probe unit including a first contact member configured to contact the object of a macroscale;
   a second probe unit including a second contact member configured to contact the object of a microscale; and
   a third probe unit including a third contact member configured to contact the object of a nanoscale.

6. The rheometer of claim 5, further comprising:
   first to third objective lenses configured to have a magnification applied depending on a type of the object, the first to third objective lenses corresponding to the first to third probe units, wherein any one of the first to third objective lenses is selected and is directed toward the object.

7. The rheometer of claim 6, further comprising:
   a laser light source configured to irradiate a laser light to the object through the selected objective lens of the first to third objective lenses; and
   a Raman detector configured to detect a scattered light incident on the Raman detector, wherein the scattered light is converted from the laser light by the object.

8. The rheometer of claim 1, wherein the controller calculates a viscous force and an elastic force of the object based on the following.

$$k_{int} = \frac{F}{A} + \sin\theta + m\omega^2 - k$$

$$b_{int} = \frac{F}{A\omega}\cos\theta - b$$

$$F_k = k_{int}A$$

$$F_b = b_{int}\omega A$$

$$E_{dis} = -\frac{\pi k A_0^2}{Q}\left[\frac{A}{A_0}\cos\theta - \frac{\omega}{\omega_0}\left(\frac{A}{A_0}\right)\right]$$

9. The rheometer of claim 8, wherein the controller calculates a storage modulus and a loss modulus of the object based on the following.

$$G' = \frac{\delta}{2\sigma}(k_{int} + b_{int}w)$$

$$G'' = \frac{\delta}{2\sigma}(-k_{int} + b_{int}w)$$

10. The rheometer of claim 1, further comprising:
    a temperature control unit configured to control a temperature of the substrate; and
    a vibration measurement unit configured to measure the vibration of the quartz tuning fork,
    wherein the controller calculates physical properties of the object based on the temperature of the substrate, the vibration of the vibration unit, and a vibration measured by the vibration measurement unit.

* * * * *